US011313999B2

(12) United States Patent (10) Patent No.: US 11,313,999 B2
Carrigan et al. (45) Date of Patent: Apr. 26, 2022

(54) OPTICAL SYSTEM HAVING INTEGRATED PRIMARY MIRROR BAFFLE AND SHUTTER MECHANISM

(71) Applicant: Raytheon Company, Waltham, MA (US)

(72) Inventors: Keith Carrigan, Marina Del Rey, CA (US); Robert L. Patterson, Manhattan Beach, CA (US); Jonathan Tong, Bethesda, MD (US)

(73) Assignee: Raytheon Company, Waltham, MA (US)

( * ) Notice: Subject to any disclaimer, the term of this patent is extended or adjusted under 35 U.S.C. 154(b) by 113 days.

(21) Appl. No.: 16/420,106

(22) Filed: May 22, 2019

(65) Prior Publication Data

US 2020/0371276 A1 Nov. 26, 2020

(51) Int. Cl.
 *G02B 27/14* (2006.01)
 *G02B 23/00* (2006.01)
 (Continued)

(52) U.S. Cl.
 CPC ............ *G02B 5/08* (2013.01); *G02B 27/0977* (2013.01)

(58) Field of Classification Search
 CPC ...... G02B 27/144; G02B 23/00; G02B 23/08; G02B 15/00; G02B 17/08; G02B 5/04;
 (Continued)

(56) References Cited

U.S. PATENT DOCUMENTS 4,051,499 A 9/1977 Kondo
4,286,581 A * 9/1981 Atkinson, Jr. .......... F24S 23/00
 126/585

(Continued)

FOREIGN PATENT DOCUMENTS

CN 106114912 A 11/2016
EP 2508929 A2 10/2012

OTHER PUBLICATIONS

Harris, SpaceView, https://www.harris.com/solution/spaceview, to the best of applicant's knowledge article was available before the application filing date of May 22, 2019, 4 pages, Harris Corporation, Melbourne, FL.

(Continued)

*Primary Examiner* — Dawayne Pinkney

(57) ABSTRACT

An optical system is disclosed that can include a focal plane. The optical system can also include a primary mirror located in front of the focal plane and having a hole operable to allow light to pass through the primary mirror. The optical system can further include a secondary mirror located in front of the primary mirror and operable to direct light through the hole to the focal plane. The optical system can still further include an intermediate field baffle located at least partially in front of the focal plane. In addition, the optical system can include a shutter mechanism located in front of the baffle. An integrated baffle and shutter device is also disclosed that can include a shutter mechanism having a paddle and an actuator operable to selectively move the paddle between an open position that allows light past the shutter mechanism and a closed position that blocks light. The integrated baffle and shutter device can also include a primary mirror baffle coupled to the shutter mechanism on a front side of the shutter mechanism. The primary mirror baffle can form a housing about the paddle.

23 Claims, 6 Drawing Sheets

(51) Int. Cl.
  *G02B 13/00* (2006.01)
  *G02B 5/08* (2006.01)
  *G02B 27/09* (2006.01)

(58) Field of Classification Search
  CPC .. G02B 17/0668; G02B 17/061; G02B 13/00; G02B 23/12; G02B 21/361; A45D 42/18; G02F 7/70225; G02F 7/70233; B60R 1/081
  USPC .............. 359/629, 399, 402, 744, 855–860, 359/362–366, 400
  See application file for complete search history.

(56) References Cited

U.S. PATENT DOCUMENTS

| | | | |
|---|---|---|---|
| 6,072,572 | A | 6/2000 | Hatfield et al. |
| 6,075,597 | A * | 6/2000 | Olshausen ................ G01J 3/26 356/450 |
| 7,948,677 | B2 | 5/2011 | Voigt et al. |
| 2005/0046979 | A1 | 3/2005 | Hiley et al. |
| 2010/0316437 | A1 | 12/2010 | Newswander |
| 2012/0321292 | A1* | 12/2012 | Viglione .................. G03B 9/22 396/458 |
| 2017/0339221 | A1* | 11/2017 | Wang .................. H04L 67/1014 |
| 2017/0339321 | A1 | 11/2017 | Leonelli, Jr. |
| 2017/0371139 | A1* | 12/2017 | Ueda .................. G01N 21/3577 |
| 2018/0027168 | A1 | 1/2018 | Sugita |
| 2018/0210166 | A1 | 7/2018 | Cannon et al. |
| 2018/0316862 | A1 | 11/2018 | Miller et al. |

OTHER PUBLICATIONS

NASA, Hubble Space Telescope, https://www.nasa.gov/content/goddard/hubble-space-telescope-pointing-control-system, Dec. 20, 2017, 3 pages, National Aeronautics and Space Administration, Washington, DC.

U.S. Appl. No. 16/167,437, filed Oct. 22, 2018, Scott Balaban.

Anonymous, SENTINEL-2, ESA's Optical High-Resolution Mission for GMES Operational Services, https://sentinel.esa.int/documents/247904/349490/s2_sp-1322_2.pdf, Mar. 2, 2012, 80 pages, ESA Communications, Netherlands.

Guanter et al., The EnMAP Spaceborne Imaging Spectroscopy Missino for Earth Observation, Jul. 13, 2015, pp. 8830-8857, vol. 7, No. 7, Remote Sensing.

Krodel et al., Extreme stable and complex structures for opto-mechanical applications, Material Technologies and Applications to Optics, Structures, Components, and Sub-Systems II, Sep. 2, 2015, 12 pages, vol. 9574, SPIE Optical Engineering + Applications, San Diego, California.

International Search Report for International Application No. PCT/US2020/024099 dated Jul. 3, 2020, 17 pages.

Applewhite et al., Effects of thermal gradients on the Mars observer camera primary mirror, Design of Optical Instruments, Sep. 16, 1992, 12 pages, vol. 1690, SPIE, Orlando, Florida.

Wulser et al., EUVI: the STERO-SECCHI extreme ultraviolet imager, Telescopes and Instrumentation for Solar Astrophysics, Feb. 4, 2004, 12 pages, vol. 5171, SPIE, San Diego, California.

International Search Report for International Application No. PCT/US2020/024101 dated Jul. 2, 2020, 17 pages.

* cited by examiner

OPTICAL SYSTEM HAVING INTEGRATED PRIMARY MIRROR BAFFLE AND SHUTTER MECHANISM

BACKGROUND

Telescope designs where a secondary mirror creates an obscuration in a primary mirror aperture (e.g., Cassegrain reflector telescopes) are referred to generally as obscured telescopes. In obscured telescope designs, there is a space at the center of the primary mirror where the secondary mirror creates the obscuration. Obscured telescopes typically require baffling to control stray light, and optical systems in which obscured telescopes are used may also need a shutter mechanism for self-protection or built-in testing. Baffling is often located in the obscuration space of the primary mirror, but otherwise the obscuration space serves no function. Shutter mechanisms are typically located at or near a focus (e.g., a focal plane or intermediate image) or a pupil in the optical system to minimize the size of the shutter mechanism needed to block the light.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Although obscured telescopes that incorporate baffles in the obscuration space and shutter mechanisms at the focal plane have been successfully implemented, this design configuration is not without its drawbacks. In particular, locating a shutter mechanism at the focal plane is likely to compromise mirror structural members and interfaces in that location, and therefore typically requires special packaging in the structural design of the optical system in order to accommodate the shutter mechanism at the focal plane. Inefficient use of space and the additional complexity of accommodating a shutter mechanism in the structural design of an optical system can increase the cost and schedule of an optical system.

Accordingly, an optical system is disclosed that efficiently utilizes available space, which can include at least partially locating components, such as a baffle and a shutter mechanism, in an obscuration space. The optical system can include a focal plane. The optical system can also include a primary mirror located in front of the focal plane and having a hole operable to allow light to pass through the primary mirror. The optical system can further include a secondary mirror located in front of the primary mirror and operable to direct light through the hole to the focal plane. The optical system can still further include an intermediate field baffle located at least partially in front of the focal plane. In addition, the optical system can include a shutter mechanism located in front of the baffle.

In one aspect, an integrated baffle and shutter device is disclosed. The integrated baffle and shutter device can include a shutter mechanism having a paddle and an actuator operable to selectively move the paddle between an open position that allows light past the shutter mechanism and a closed position that blocks light. The integrated baffle and shutter device can also include a primary mirror baffle coupled to the shutter mechanism on a front side of the shutter mechanism. The primary mirror baffle can form a housing about the paddle.

Figure 1A:
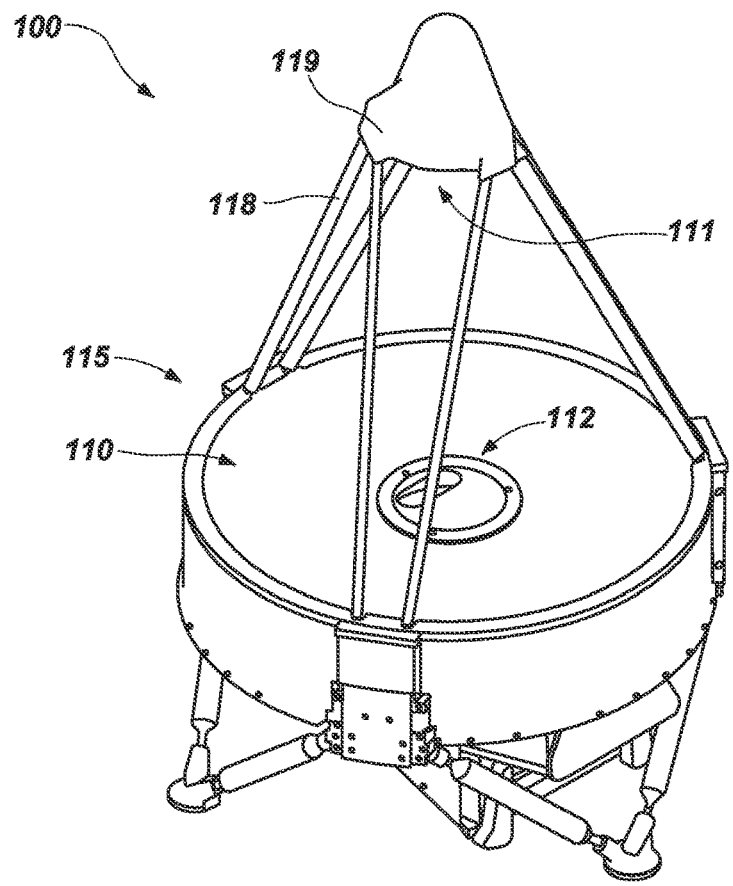
FIG. 1A is an illustration of an optical system in accordance with an example of the present disclosure.
Figure 1B:
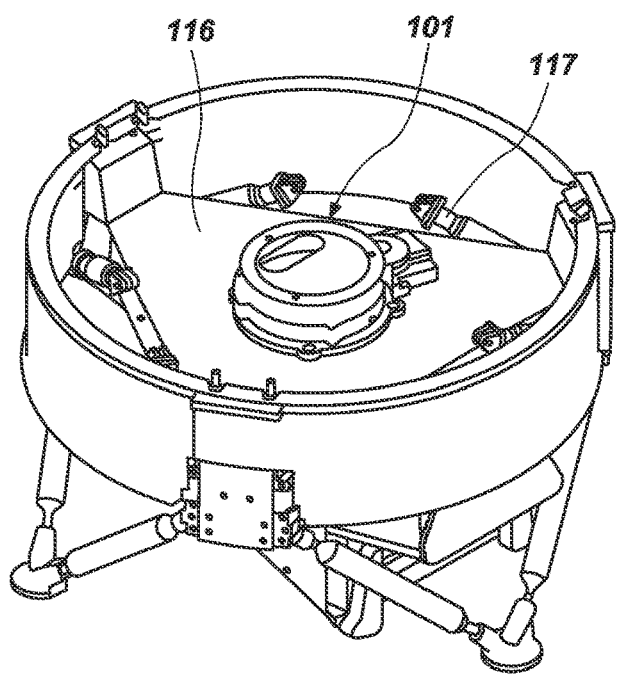
FIG. 1B is an illustration of the optical system of FIG. 1A with a portion of the optical system shown with certain components omitted to reveal features and components hidden from view in FIG. 1A.
Figure 2:
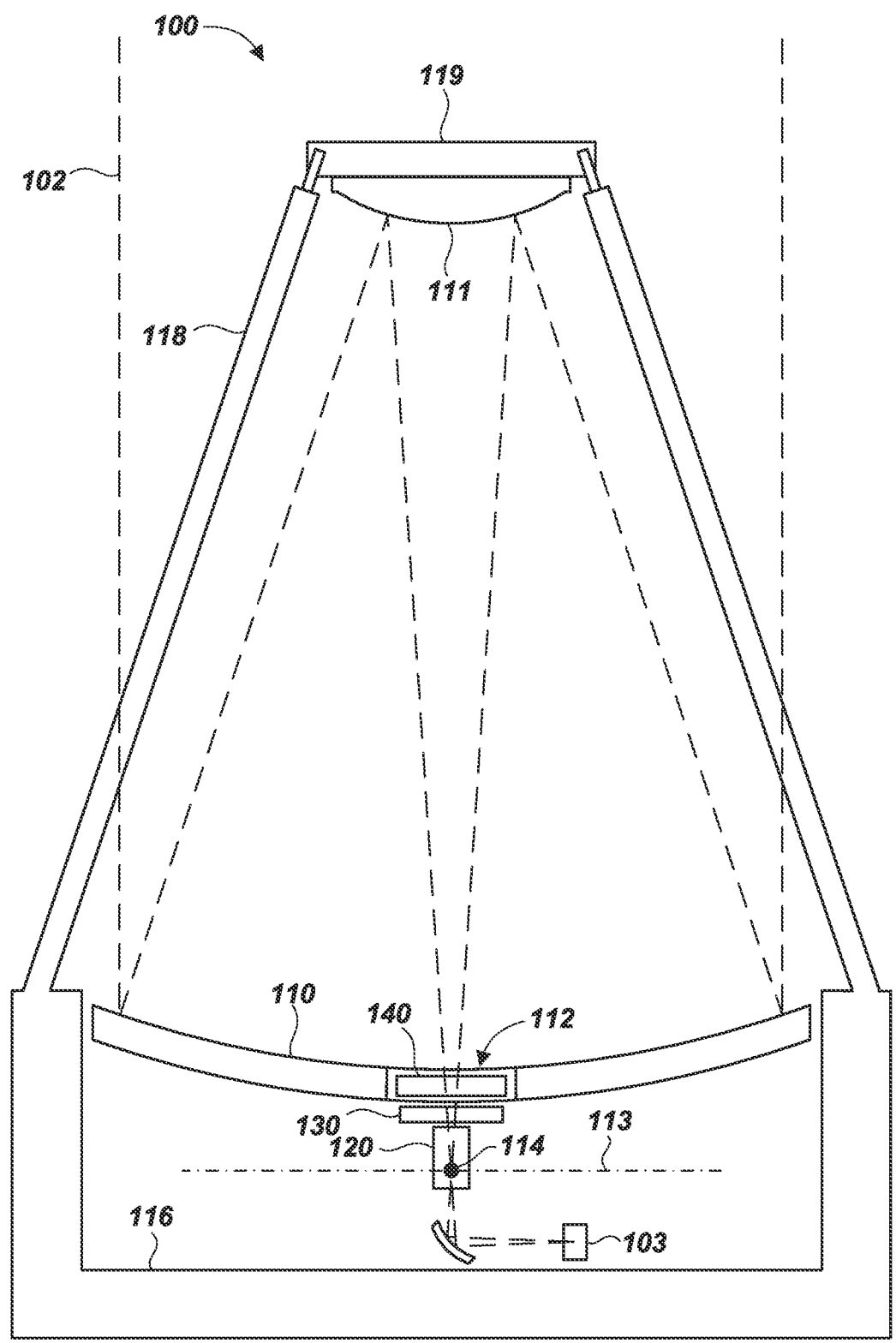
FIG. 2 is a schematic representation of certain elements of the optical system of FIG. 1A, in accordance with an example of the present disclosure.

To further describe the present technology, examples are now provided with reference to the figures. With reference to FIG. 1A, one embodiment of an optical system 100 is illustrated. A portion of the optical system 100 is shown in FIG. 1B with certain components omitted to reveal features and components hidden from view in FIG. 1A. A schematic representation of certain elements of the optical system 100 is shown in FIG. 2. With reference to FIGS. 1A-2, the optical system 100 can include a primary mirror 110 and a secondary mirror 111 located in front of the primary mirror 110 (i.e., relative to incoming light 102). The primary mirror 110 can have an aperture or hole (e.g., see aperture or hole 112) operable to allow light to pass through the primary mirror 110, and the secondary mirror 111 can be operable to direct light through the hole 112 to a focal plane 113 at a focal point 114 (i.e., an intermediate image or intermediate focus) of the secondary mirror 111, as well as to an optical sensor 103 supported and located in back of the primary mirror 110 (i.e., relative to incoming light 102). The hole 112 may be defined or bounded by the secondary mirror 111 obscuration in the primary mirror 110 aperture. In some embodiments, the primary mirror 110 and the secondary mirror 111 form a Cassegrain reflector, which may be used in optical telescopes (e.g., high resolution imaging systems) and radio antennas. In addition, the optical system 100 can be any type of optical system, such as an optical telescope, a laser, etc.

A support structure 115 can support the primary and secondary mirrors 110, 111. For example, the support structure 115 can comprise a metering structure, which can include a base 116 (see FIG. 1B) (e.g., including a bench that can form the structural base of the optical system 100) coupled to the primary mirror 110 by one or more primary mirror struts 117. The support structure 112 can also include one or more secondary mirror struts 118 extending from the base 116 and coupled to the secondary mirror 111 for locating the secondary mirror 111 a distance from the primary mirror 110. For example, the secondary mirror struts 118 can support a secondary mirror mount 119 at a given, predetermined distance, which secondary mirror mount 119 can be coupled to the secondary mirror 111.

The optical system 100 can also include a baffle 120 (e.g., an intermediate field baffle) located at least partially in front of the focal plane 113. In some embodiments, the intermediate field baffle 120 can be located at the focal plane 113. In this case, the intermediate field baffle 120 can be configured such that the focal point 114 or intermediate image is located within the intermediate field baffle 120. The intermediate field baffle 120 can therefore serve to block stray light in front of the focal point 114 and, optionally, behind the focal point 114 along the optical path of the incoming light 102. In one aspect, the intermediate field baffle 120 can be located behind the primary mirror 110. The optical system 100 can further include a shutter mechanism 130 located in front of the intermediate field baffle 120 (i.e., relative to incoming light 102). In one aspect, the shutter mechanism 130 can be located behind the primary mirror 110. In some embodiments, the optical system 100 can include a primary mirror baffle 140 in front of the shutter mechanism 130 (i.e., relative to incoming light 102). In one aspect, the primary mirror baffle 140 can be located at least partially in the hole 112 of the primary mirror 110. Thus, in some embodiments, the primary mirror baffle 140, the shutter mechanism 130, and/or the baffle 120 (e.g., an intermediate field baffle) can be located in the optical path of the incoming light 102 before or at least partially in front of the focal plane 113.

Figure 3A:
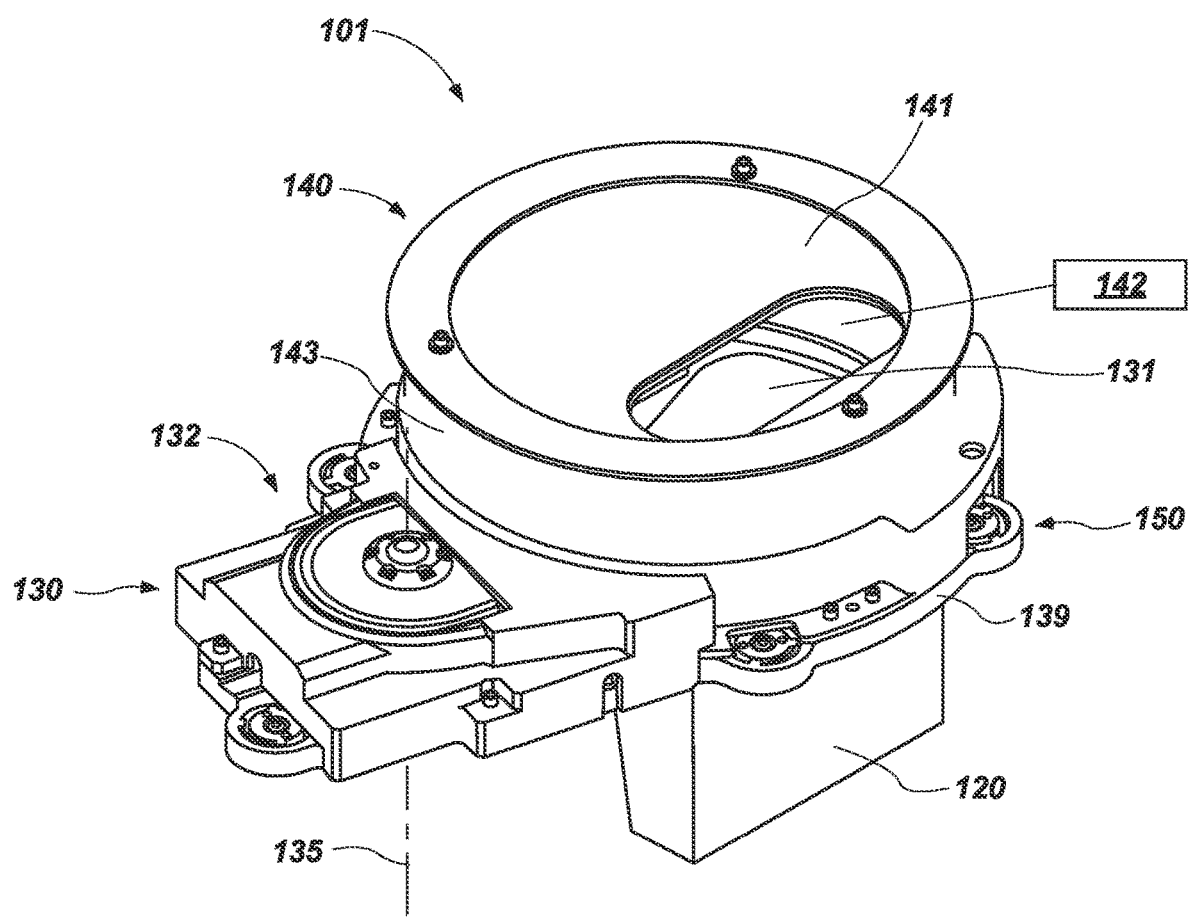
FIG. 3A a perspective view of an integrated baffle and shutter device of the optical system of FIG. 1A, in accordance with an example of the present disclosure.
Figure 3B:
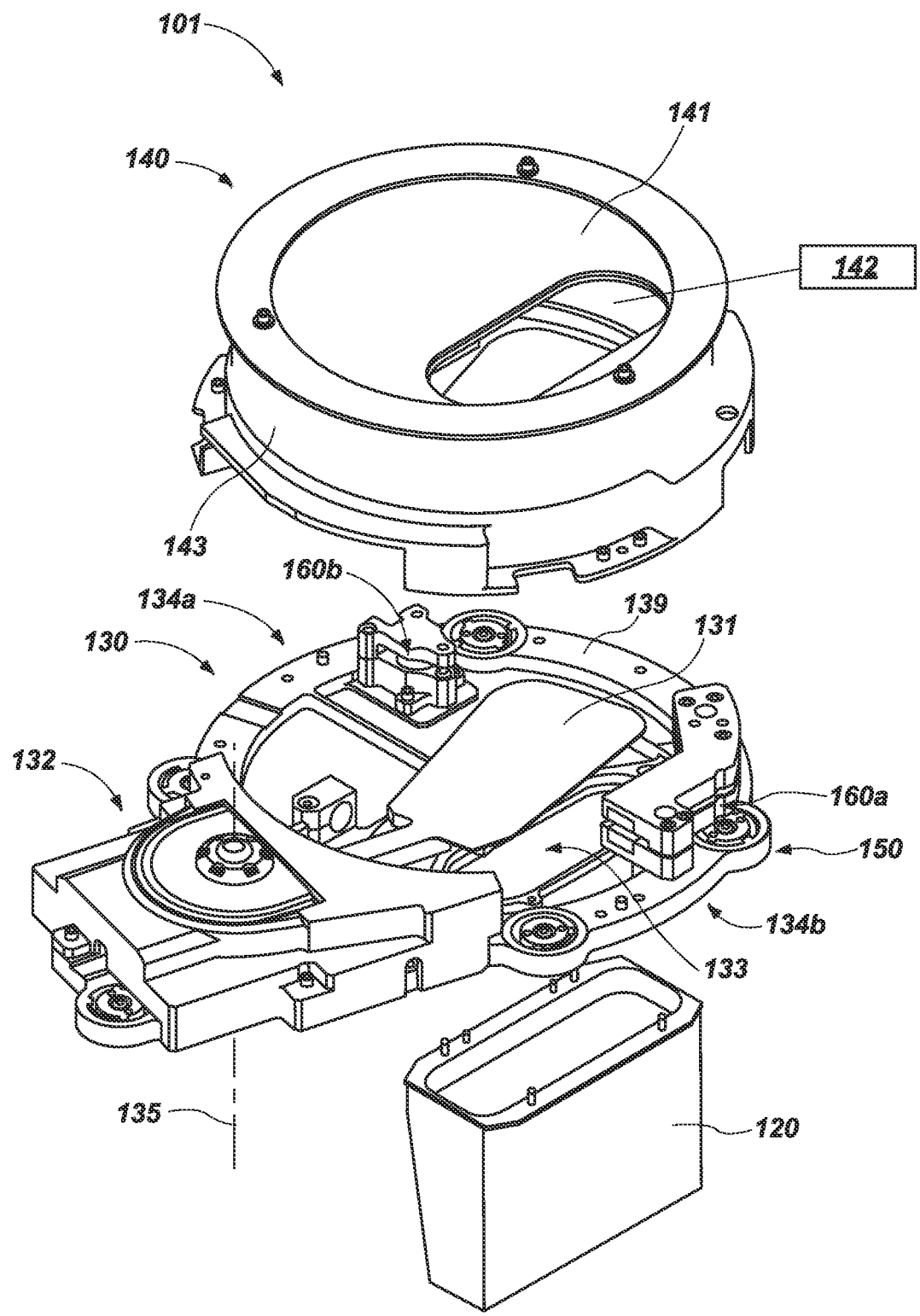
FIG. 3B is an exploded view of the integrated baffle and shutter device of FIG. 3A.
Figure 4A:
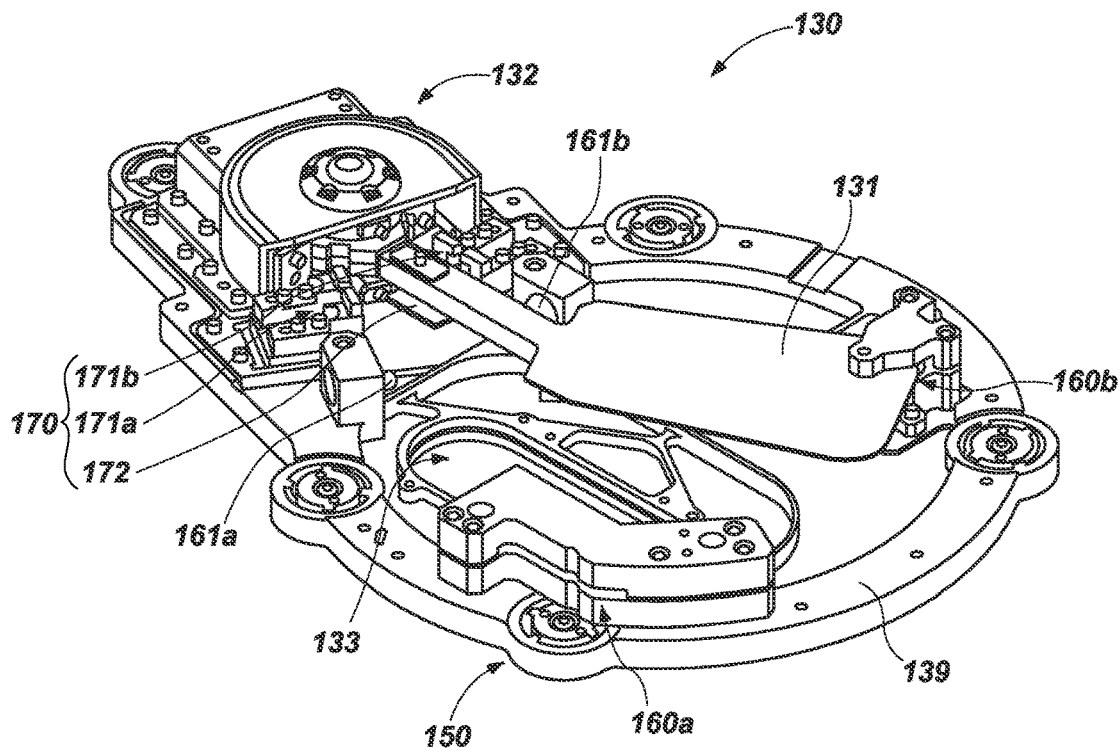
FIG. 4A is an illustration of a shutter mechanism in an open position, in accordance with an example of the present disclosure.
Figure 4B:
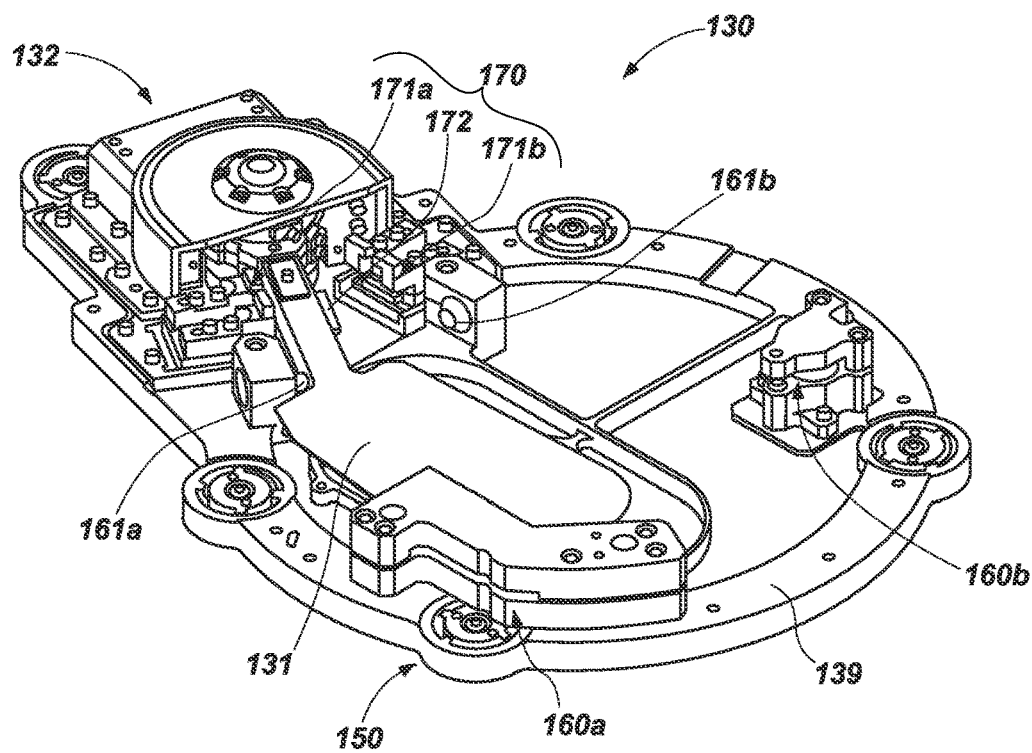
FIG. 4B is an illustration of a shutter mechanism in a closed position, in accordance with an example of the present disclosure.
Figure 5:
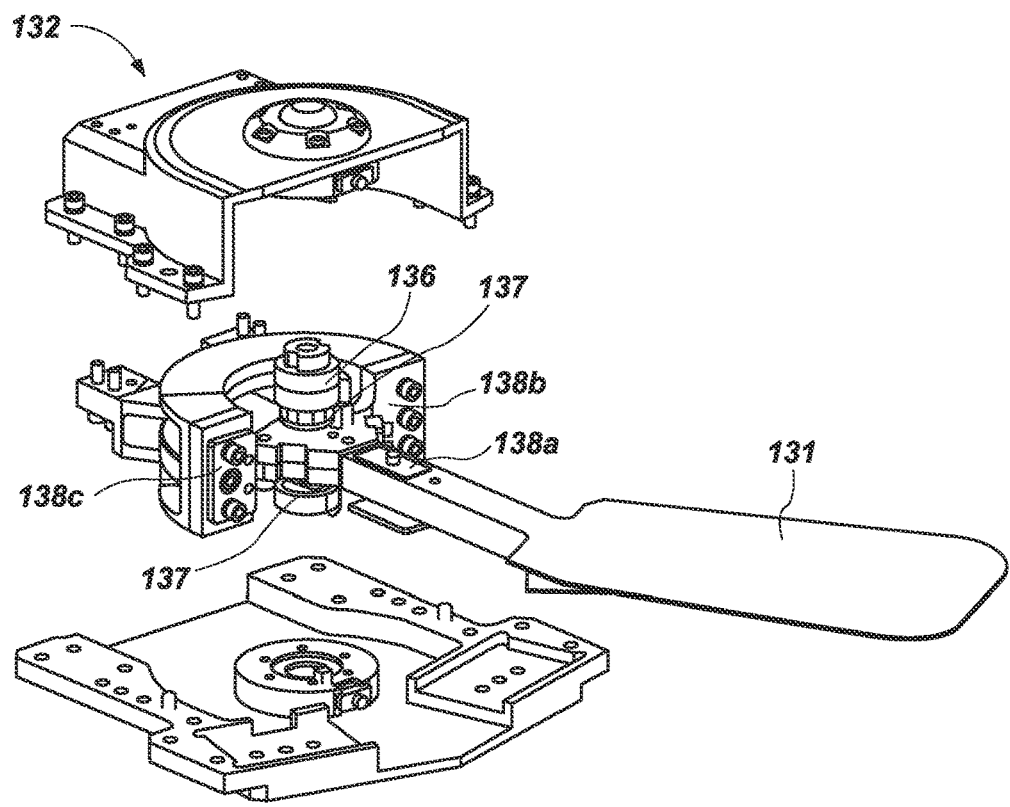
FIG. 5 is an exploded view of a paddle and an actuator of the shutter mechanism of FIGS. 4A and 4B, in accordance with an example of the present disclosure.

In one aspect, the optical system 100 can further comprise an integrated baffle and shutter device. Perspective and exploded views of an exemplary integrated baffle and shutter device 101 isolated from the rest of the optical system 100 are shown in FIGS. 3A and 3B, respectively. The shutter mechanism 130 is shown isolated in FIGS. 4A and 4B with certain features omitted to reveal components hidden from view in FIGS. 3A and 3B. With reference to FIGS. 1A-4B, the integrated baffle and shutter device 101 can include the shutter mechanism 130 and the primary mirror baffle 140 in a fore-optics assembly (i.e., in front of the optical sensor 103). The shutter mechanism 130 can include a paddle 131 operable to selectively block light (e.g., from the secondary mirror 111) and an actuator 132 operable to move the paddle 131 between an open position (FIG. 4A) that allows light past the shutter mechanism 130 through an aperture 133 in the shutter mechanism 130 (e.g., to the optical sensor 103 in FIG. 2) and a closed position (FIG. 4B) that blocks light from passing through the aperture 133 (e.g., to provide protection for the optical sensor 103 in FIG. 2). An exploded view of the paddle 131 and actuator 132 is shown in FIG. 5. The primary mirror baffle 140 can be coupled to the shutter mechanism 130 on a front side 134a of the shutter mechanism 130. In one aspect, the primary mirror baffle 140 can form a housing 141 about the paddle 131. In some embodiments, the integrated baffle and shutter device 101 can include the intermediate field baffle 120, which can be coupled to the shutter mechanism 130 on a back side 134b of the shutter mechanism 130.

In general, the components that make up the integrated baffle and shutter device 101 can be located in the secondary mirror 111 obscuration, which is space that goes unutilized (except for baffling) in a typical or conventional obscured telescope design, making for an efficient use of space in the optical system 100. In addition, by integrating the baffle 140 with the shutter mechanism 130 and locating these components in the secondary mirror 111 obscuration, the integrated baffle and shutter device 101 provides baffling for the control of stray light and a protective shutter mechanism compactly located in a space of the optical system 100 that is minimally intrusive to the structural design of the system. In other words, the design of the support structure 115 to accommodate the shutter mechanism 130 may be minimally impacted because the shutter mechanism 130 is located in a preexisting void in the primary mirror 110. This can enable parallel development of the integrated baffle and shutter device 101 and the support structure 115, thus saving cost and schedule for the development of the optical system 100.

As shown in FIG. 1A, the shutter mechanism 130 can be coupled to the support structure 115 (e.g., the base 116) for the primary mirror 110. To accommodate differential thermal expansion and contraction between the shutter mechanism 130 and the support structure 115 (e.g., the base 116), the shutter mechanism 130 can be coupled to the support structure 115 via a flexure 150. A flexure, as typically known in the mechanical arts, is a flexible element or combination of elements configured to be compliant (e.g., bending and/or torsion) in one or more specific degrees of freedom. The flexures disclosed herein can be of any suitable type or construction, such as a pin flexure, a blade flexure, a notch flexure, a beam flexure, a diaphragm flexure, or others as known in the art.

Figure 6:
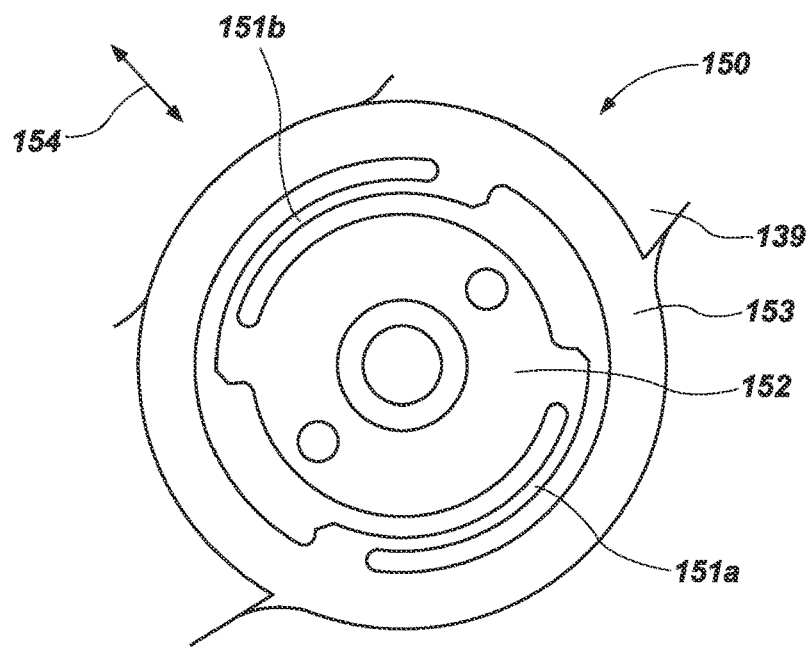
FIG. 6 is a detail view of a flexure of the shutter mechanism of FIGS. 4A and 4B, in accordance with an example of the present disclosure.

In the example embodiment illustrated in FIGS. 3A-4B, one or more flexures 150 can be included at the mounting interface between the shutter mechanism 130 and the support structure 115 operable to accommodate differential thermal expansion and contraction between these components. A detailed view of a representative flexure 150 is shown in FIG. 6. In this example, the flexure 150 is configured as a blade flexure. In particular, the flexure 150 comprises a pair of flexure blades 151a-b that connect an inner coupling portion 152 to an outer portion 153. The inner coupling portion 152 is configured to facilitate coupling with the support structure 115 (e.g., the base 116), while the outer portion 153 is integrated with or coupled to a frame 139 of the shutter mechanism 130. The flexure blades 151a-b are in a parallel configuration and operable to be compliant and allow flexibility in direction 154. It should be recognized that the illustrated embodiment is not intended to be limiting in any way and that the flexure 150 can comprise any suitable type of flexure in any configuration in accordance with the principles disclosed herein.

In one aspect, the plurality of flexures 150 in the example embodiment illustrated in FIGS. 3A-4B can be configured such that compliance is only provided for thermal expansion/contraction while providing stiffness under mechanical loads (e.g., static and/or dynamic loads, such as vibrations). For example, the flexures 150 can be oriented such that they are compliant radially under thermoelastic growth/contraction and such that the plurality or set or group of flexures 150 provides stiffness under radial or lateral mechanical loads. As illustrated, this can be accomplished by orienting each flexure 150 for radial compliance from a given location, such as a center point of the set or group of flexures 150.

Because each of the flexures 150 can be configured to be stiff transverse to its compliant direction (i.e., the radial direction), at least two of the flexures in a group can provide stiffness that resists lateral mechanical displacements. Thus, each set or group of flexures 150 can provide radial compliance to accommodate thermoelastic growth or shrinkage while also providing stiffness in other (e.g., lateral) degrees of freedom for mechanical loads.

In some embodiments, as shown in FIGS. 3A and 3B, the integrated baffle and shutter device 101 can include a heater 142 operable to heat the primary mirror 110. In one aspect, the housing 141 can include a heating interface surface 143 operable to transfer heat to the primary mirror 110. In this case, the heater 142 can be disposed in the housing 141 and operable to heat the heating interface surface 143, and thereby heat the primary mirror 110, to control the temperature of the primary mirror 110. In some embodiments, the heating interface surface 143 can be configured as a radiative thermal control surface (e.g., a black surface) to radiate energy to the primary mirror 110. Thus, the heater 142 and the heating interface surface 143 can form a thermal control system for the primary mirror 110, which is integrated into the structure of the primary mirror baffle 140. In one embodiment, a thermal control system can comprise a thermofoil heater 142 and a thermistor (not shown) operable to sense the temperature of the primary mirror 110 and utilize a closed feedback loop to add heat to maintain the primary mirror 110 at a given temperature. The heater 142 can be or include any suitable type of heater or heating element known in the art for heating the primary mirror 110. Similarly, any suitable type of sensor known in the art can be used to control operation of the heater 142 to heat the primary mirror 110.

Referring again to FIG. 2, it should be noted that the location of the shutter mechanism 130 is not at (i.e., is away from) the focal plane 113, which is the location of the smallest image (i.e., the intermediate image) reflected from the secondary mirror 111. Instead of locating the shutter mechanism 130 at the intermediate image (as is typically done), the shutter mechanism 130 is located in front of the intermediate image with at least a portion of the intermediate field baffle 120 being located between the intermediate image and the shutter mechanism 130. Although locating the shutter mechanism 130 in front of the focal plane 113 or intermediate image may not be preferred based solely on shutter considerations, the design of the integrated baffle and shutter device 101 combining stray light control and blocking features and collocating them away from the focal plane 113 or intermediate image can optimize or provide a better overall package for the system 100.

This relationship of the shutter mechanism 130 and the intermediate image impacts the shutter mechanism 130 in several ways. For example, by locating the shutter mechanism 130 where the image size is larger than at the focal plane 113, the shutter mechanism 130 must be configured to block a larger area of light than at the focal plane 113. In the embodiment illustrated in FIGS. 3A-5, the shutter mechanism 130 incorporates the paddle 131 for this purpose, which is moved between the open and closed positions by the actuator 132. The paddle 131 may be considered as a component in a leaf-type shutter mechanism. Although a paddle or leaf-type shutter mechanism is utilized in the illustrated example embodiment as a light blocking mechanism, it should be recognized that any suitable light blocking mechanism known in the art may be utilized as appropriate for a given application, such as a diaphragm shutter mechanism, etc.

In general, the paddle 131 can comprise a material operable to at least partially block light (e.g., an opaque material) and can be configured to be moved into or out of a light blocking position. The paddle 131 can have any suitable design or configuration to accomplish these objectives. The actuator 132 can be configured to couple with the paddle 131 and move the paddle 131 into or out of a light blocking position. The actuator 132 can be of any suitable type or configuration, such as a rotary actuator and/or a linear actuator, etc. In the illustrated embodiment, the actuator 132 is configured as a rotary actuator rotatable about a rotary axis 135. In this case, the rotary axis 135 is vertically oriented (i.e., parallel to a pointing direction of the optical system 100), although it should be recognized that a rotary axis can have any suitable orientation (e.g., horizontal or orthogonal to the vertically oriented rotary axis 135). In the illustrated embodiment, the rotary actuator 132 is a voice coil actuator, although other types of rotary actuators are contemplated. Due to the position of the shutter mechanism 130 relative to the focal plane 113 and the relatively large angular range of travel that may be required to enable the paddle 131 to alternately obstruct light in the closed position and allow light to pass in the open position, the actuator 132 can include bearings 136 (e.g., ball bearings), bushings, etc., as shown in FIG. 5, which enables a greater range of motion than what is available with pivot flexures often used for such purposes. The actuator 132 can also include one or more return springs 137 (FIG. 5) that bias the paddle 131 toward the open (or closed) position to move or return the paddle 131 to the open (or closed) position when the actuator 132 is unenergized or inactive. The return springs 137 can provide a fail-safe to return the paddle 131 to the open (or closed) position in the event of a failure of the actuator 132.

In one aspect, as shown in FIG. 5, the shutter mechanism 130 can further include balancing weights 138*a-c* to balance the center of gravity of the paddle 131 and the rotating components of the actuator 132 connected to the paddle 131 about the rotary axis 135. The balancing weights 138*a-c* can be constructed of any suitable material (e.g., tungsten) and can be configured for adjustment (e.g., coupled via pins and slots and secured with fasteners) to achieve a desired balance.

With further reference to FIGS. 3B-4B, in one aspect, the shutter mechanism 130 can include one or more dampers (e.g., see dampers 160*a*, 160*b*) to arrest paddle 131 momentum and passively slow the moving shutter components. Any suitable type of damper may be utilized. In one embodiment, the dampers 160*a*, 160*b* can comprise an eddy current type of damper. In this case, eddy current dampers can include magnets and the paddle 131 can include a conductive material that is configured to pass through the magnetic fields generated by the magnets to generate eddy currents in the conductive material of the paddle 131, which resist and dampen motion of the paddle 131. In some embodiments, the shutter mechanism 130 may be configured to rapidly close (i.e., move the paddle 131 to the closed position) and open (i.e., move the paddle 131 to the open position) at high angular velocities. The damper 160*a* can be operable to dissipate kinetic energy and prevent rebound of the paddle 131 when the paddle 131 is moving to the closed position. In one aspect, damping may only occur once the paddle 131 is over the aperture 133. On the other hand, the damper 160*b* can be operable to dissipate kinetic energy and prevent rebound of the paddle 131 when the paddle 131 is moving to the open position. Typical high-speed shutter mechanisms often require complex electronic controls to achieve high close velocities while managing the momentum of the moving components to prevent damage to the shutter mechanism. The need for complex electronic controls can increase the cost and schedule of an optical system. Eddy current dampers can arrest component momentum without complex electronic controls, thus simplifying the electronic interface between the shutter mechanism and its control electronics, saving cost and schedule for the development of the optical system. In addition, eddy current dampers can arrest momentum without contacting the paddle 131 regardless of the direction of motion and are not temperature sensitive.

In one aspect, the shutter mechanism 130 can further include stops 161a, 161b to establish range of motion travel limits. For example, the stop 161a can be operable to establish a range of motion limit associated with the closed position, and the stop 161b can be operable to establish a range of motion limit associated with the open position. The stops 161a, 161b can be configured to limit peak reaction loads when the paddle 131 has reached its travel limits. In one example, the stops 161a, 161b can include a movable plunger supported by a spring (e.g., a VLIER® plunger). In some embodiments, the plunger can be adjustable to establish a variable stop position.

In one aspect, the shutter mechanism 130 can include a paddle position telemetry system 170. Any suitable type of telemetry technology can be utilized. In some embodiments, the paddle position telemetry system 170 can comprise a Hall effect sensor. For example, the paddle position telemetry system 170 can include a Hall effect device (HED) 171a, 171b associated with the closed and open positions, respectively. Each HED 171a, 171b can include one or more Hall effect sensors and a permanent magnet separated from the Hall effect sensors by a gap. The Hall effect sensors produce a voltage in the presence of a magnetic field. Thus, in the "on" or voltage-producing state, the Hall effect sensors are in the presence of a magnetic field generated by the permanent magnet. The paddle position telemetry system 170 can also include a chopper 172 coupled to the paddle 131. The chopper 172 is made of a magnetic material (e.g., a ferromagnetic or ferrimagnetic material). When the chopper 172 moves into the gap between the Hall effect sensors and the permanent magnet, the chopper 172 redirects magnetic flux from the Hall effect sensors, which cease producing a voltage and enter an "off" state. Thus, when the paddle 131 is in the closed position (FIG. 4B), the chopper 172 causes the Hall effect sensor of the HED 171a to enter the "off" state, indicating that the paddle 131 is in the closed position. When the paddle 131 is in the open position (FIG. 4A), the chopper 172 causes the Hall effect sensor of the HED 171b to enter the "on" state, indicating that the paddle 131 is in the open position. The use of Hall effect sensors allows for a reliable, non-contact indication of the position of the paddle 131. Although the paddle position telemetry system 170 has been described utilizing Hall effect sensors, this is not intended to be limiting and other sensors or switches known in the art can be utilized to determine whether the paddle 131 is in the open or closed position.

In accordance with one embodiment of the present invention, a method for configuring an optical system is disclosed. The method can comprise obtaining a primary mirror having a hole operable to allow light to pass through the primary mirror. The method can also comprise locating a secondary mirror in front of the primary mirror to direct light through the hole to a focal plane in back of the primary mirror. The method can further comprise locating an intermediate field baffle at least partially in front of the focal plane. Additionally, the method can comprise locating a shutter mechanism in front of the intermediate field baffle. In one aspect, the method can comprise locating a primary mirror baffle in front of the shutter mechanism. It is noted that no specific order is required in this method, though generally in one embodiment, these method steps can be carried out sequentially.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology,

What is claimed is:
1. An optical system, comprising:
   a focal plane;
   a primary mirror located in front of the focal plane and having a hole operable to allow light to pass through the primary mirror;
   a secondary mirror located in front of the primary mirror and operable to direct light through the hole to the focal plane;
   an intermediate field baffle located at least partially in front of the focal plane; and
   a shutter mechanism located in front of the intermediate field baffle and between the intermediate field baffle and the secondary mirror, the shutter mechanism being operable to open and close to selectively allow and block passage of light to the focal plane.

2. The optical system of claim 1, wherein the intermediate field baffle is located behind the primary mirror.

3. The optical system of claim 1, further comprising a primary mirror baffle located in front of the shutter mechanism.

4. The optical system of claim 3, wherein the primary mirror baffle is located at least partially in the hole.

5. The optical system of claim 1, wherein the shutter mechanism is located behind the primary mirror.

6. The optical system of claim 1, further comprising a heater operable to heat the primary mirror.

7. The optical system of claim 1, wherein the shutter mechanism comprises a paddle operable to selectively block light from the secondary mirror and an actuator operable to move the paddle between an open position that allows light past the shutter mechanism and a closed position that blocks light.

8. The optical system of claim 7, wherein the actuator comprises at least one of a rotary actuator or a linear actuator.

9. The optical system of claim 8, wherein the rotary actuator comprises at least one of a ball bearing or a bushing to provide an angular range of travel for the paddle between the open and closed positions.

10. The optical system of claim 8, wherein the rotary actuator comprises a voice coil actuator.

11. The optical system of claim 7, wherein the shutter mechanism comprises a return spring biased toward the open position and operable to move the paddle to the open position.

12. The optical system of claim 7, wherein the shutter mechanism comprises an eddy current damper to arrest paddle momentum.

13. The optical system of claim 7, wherein the shutter mechanism comprises a paddle position telemetry system.

14. The optical system of claim 13, wherein the paddle position telemetry system comprises a Hall effect sensor.

15. The optical system of claim 1, wherein the shutter mechanism is coupled to a support structure for the primary mirror.

16. The optical system of claim 15, wherein the shutter mechanism is coupled to the support structure via a flexure.

17. An integrated baffle and shutter device for use with an optical system, comprising:
    a shutter mechanism having a paddle and an actuator operable to selectively move the paddle between an open position that allows light past the shutter mechanism and a closed position that blocks light; and
    a primary mirror baffle integrally coupled with the shutter mechanism on a front side of the shutter mechanism, the primary mirror baffle forming a housing about the paddle.

18. The integrated baffle and shutter device of claim 17, further comprising an intermediate field baffle coupled to the shutter mechanism on a back side of the shutter mechanism.

19. The integrated baffle and shutter device of claim 17, wherein the housing comprises a heating interface surface operable to transfer heat to a primary mirror, and further comprising a heater disposed in the housing operable to heat the heating interface surface and thereby heat the primary mirror.

20. The integrated baffle and shutter device of claim 17, operable with the optical system, the optical system comprising:
    a primary mirror having a hole operable to allow light to pass through the primary mirror; and
    a secondary mirror located in front of the primary mirror and operable to direct light through the hole to a focal plane in back of the primary mirror.

21. The integrated baffle and shutter device of claim 20, wherein the shutter mechanism is coupled to a support structure for the primary mirror.

22. A method for configuring an optical system, comprising:
    obtaining a primary mirror having a hole operable to allow light to pass through the primary mirror;
    locating a secondary mirror in front of the primary mirror to direct light through the hole to a focal plane in back of the primary mirror;
    locating an intermediate field baffle at least partially in front of the focal plane; and
    locating a shutter mechanism in front of the intermediate field baffle and between the intermediate field baffle and the secondary mirror, the shutter mechanism being operable to open and close to selectively allow and block passage of light to the focal plane.

23. The method of claim 22, further comprising locating a primary mirror baffle in front of the shutter mechanism.

* * * * *